United States Patent
Duke et al.

(10) Patent No.: US 11,068,869 B1
(45) Date of Patent: Jul. 20, 2021

(54) PAYMENT VEHICLE WITH ON AND OFF FUNCTION

(71) Applicant: WELLS FARGO BANK, N.A., San Francisco, CA (US)

(72) Inventors: Michael T. Duke, Monroe, NC (US); Dean Patrick Nolan, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 13/829,236

(22) Filed: Mar. 14, 2013

Related U.S. Application Data

(62) Division of application No. 12/316,996, filed on Dec. 18, 2008, now abandoned.

(60) Provisional application No. 61/197,872, filed on Oct. 31, 2008.

(51) Int. Cl.
*G06Q 20/10* (2012.01)

(52) U.S. Cl.
CPC .................. *G06Q 20/105* (2013.01)

(58) Field of Classification Search
CPC ........ G06Q 20/20; G06Q 20/04; G06Q 20/10; G06Q 40/00; G06Q 20/341; G06Q 20/3278; G06Q 20/352; G06Q 20/105; G06Q 20/354; G06Q 20/02; G07F 7/1008
USPC .............................................. 705/35, 41, 44
See application file for complete search history.

(56) References Cited

U.S. PATENT DOCUMENTS

| 5,485,510 | A | | 1/1996 | Colbert |
| 5,573,457 | A | * | 11/1996 | Watts ..................... G07D 9/065 |
| | | | | 453/31 |
| 5,737,423 | A | * | 4/1998 | Manduley .......... G06K 19/0723 |
| | | | | 380/273 |
| 5,999,978 | A | | 12/1999 | Angal et al. |
| 6,047,268 | A | * | 4/2000 | Bartoli ................... G06Q 20/02 |
| | | | | 705/35 |
| 6,105,006 | A | | 8/2000 | Davis et al. |
| 6,188,309 | B1 | | 2/2001 | Levine |

(Continued)

FOREIGN PATENT DOCUMENTS

| GB | 2 441 156 | 2/2008 |
| KR | 20160015375 | 2/2016 |

(Continued)

OTHER PUBLICATIONS

Purchasing charges ahead. (1994). Electronic Buyers' News, , 68. Retrieved from https://dialog.proquest.com/professional/docview/681599288?accountid=131444 on Nov. 13, 2020 (Year: 1994).*

(Continued)

*Primary Examiner* — Kito R Robinson
(74) *Attorney, Agent, or Firm* — Foley & Lardner LLP

(57) ABSTRACT

A computer-based network system and method for using a payment vehicle having an on and off function. The system comprises a payment vehicle comprising an on and off function to enable or to disable the payment vehicle in the computer-based network for processing an electronic payment transaction, a holder of the payment vehicle, and a computer payment network wherein the computer payment network comprises a transaction engine for enabling or for disabling the payment vehicle at a request of the holder of the payment vehicle.

17 Claims, 8 Drawing Sheets

(56) References Cited

U.S. PATENT DOCUMENTS

| | | | |
|---|---|---|---|
| 6,193,152 B1 * | 2/2001 | Fernando | G06K 9/00154 |
| | | | 235/379 |
| 6,408,330 B1 * | 6/2002 | DeLaHuerga | A61J 1/1437 |
| | | | 709/217 |
| 6,422,462 B1 | 7/2002 | Cohen | |
| 6,494,367 B1 | 12/2002 | Zacharias | |
| 6,575,361 B1 | 6/2003 | Graves et al. | |
| 6,717,592 B2 | 4/2004 | Gusler et al. | |
| 6,845,906 B2 | 1/2005 | Royer et al. | |
| 6,865,547 B1 | 3/2005 | Brake, Jr. et al. | |
| 6,879,965 B2 | 4/2005 | Fung et al. | |
| 6,910,021 B2 | 6/2005 | Brown et al. | |
| 6,980,969 B1 * | 12/2005 | Tuchler | G06Q 20/04 |
| | | | 705/35 |
| 7,014,107 B2 | 3/2006 | Singer et al. | |
| 7,016,877 B1 | 3/2006 | Steele et al. | |
| 7,107,243 B1 | 9/2006 | McDonald et al. | |
| 7,219,833 B2 | 5/2007 | Cantini et al. | |
| 7,225,156 B2 | 5/2007 | Fisher et al. | |
| 7,249,099 B2 | 7/2007 | Ling | |
| 7,264,154 B2 | 9/2007 | Harris | |
| 7,319,986 B2 | 1/2008 | Praisner et al. | |
| 7,331,518 B2 * | 2/2008 | Rable | G06Q 20/10 |
| | | | 235/380 |
| 7,347,361 B2 * | 3/2008 | Lovett | G06Q 20/24 |
| | | | 235/380 |
| 7,359,880 B2 | 4/2008 | Abel et al. | |
| 7,383,988 B2 * | 6/2008 | Slonecker, Jr. | G06Q 20/354 |
| | | | 235/380 |
| 7,392,224 B1 | 6/2008 | Bauer et al. | |
| 7,398,248 B2 | 7/2008 | Phillips et al. | |
| 7,451,395 B2 | 11/2008 | Brants et al. | |
| 7,512,563 B2 | 3/2009 | Likourezos et al. | |
| 7,552,088 B2 | 6/2009 | Malcolm | |
| 7,571,142 B1 | 8/2009 | Flitcroft et al. | |
| 7,587,365 B2 * | 9/2009 | Malik | G06Q 20/04 |
| | | | 379/114.03 |
| 7,653,597 B1 * | 1/2010 | Stevanovski | G06Q 20/02 |
| | | | 705/40 |
| 7,685,037 B2 | 3/2010 | Reiners et al. | |
| 7,689,502 B2 | 3/2010 | Lilly et al. | |
| 7,698,221 B2 | 4/2010 | Blinn et al. | |
| 7,707,082 B1 | 4/2010 | Lapstun et al. | |
| 7,712,655 B2 | 5/2010 | Wong | |
| 7,753,265 B2 | 7/2010 | Harris | |
| 7,778,932 B2 | 8/2010 | Yan | |
| 7,818,319 B2 | 10/2010 | Henkin et al. | |
| 7,873,573 B2 | 1/2011 | Realini | |
| 7,937,325 B2 | 5/2011 | Kumar et al. | |
| 7,941,534 B2 * | 5/2011 | de la Huerga | G16H 10/60 |
| | | | 709/225 |
| 7,949,572 B2 | 5/2011 | Perrochon et al. | |
| 7,954,704 B1 * | 6/2011 | Gephart | G06Q 20/4012 |
| | | | 235/380 |
| 8,090,346 B2 | 1/2012 | Cai | |
| 8,099,109 B2 | 1/2012 | Altman et al. | |
| 8,127,982 B1 * | 3/2012 | Casey | G06Q 20/2295 |
| | | | 235/379 |
| 8,160,933 B2 | 4/2012 | Nguyen et al. | |
| 8,175,938 B2 | 5/2012 | Olliphant et al. | |
| 8,196,131 B1 * | 6/2012 | von Behren | G06Q 20/3563 |
| | | | 717/168 |
| 8,245,909 B2 | 8/2012 | Pletz et al. | |
| 8,249,983 B2 | 8/2012 | Dilip et al. | |
| 8,255,323 B1 | 8/2012 | Casey et al. | |
| 8,266,031 B2 | 9/2012 | Norris et al. | |
| 8,266,205 B2 | 9/2012 | Hammad et al. | |
| 8,280,786 B1 * | 10/2012 | Weiss | G06Q 40/02 |
| | | | 705/30 |
| 8,280,788 B2 | 10/2012 | Perlman | |
| 8,296,228 B1 * | 10/2012 | Kloor | G06Q 20/40 |
| | | | 705/39 |
| 8,297,502 B1 | 10/2012 | McGhie et al. | |
| 8,301,566 B2 | 10/2012 | Mears | |
| 8,332,294 B1 * | 12/2012 | Thearling | G06Q 30/02 |
| | | | 705/35 |
| 8,359,531 B2 | 1/2013 | Grandison et al. | |
| 8,364,556 B2 | 1/2013 | Nguyen et al. | |
| 8,396,808 B2 | 3/2013 | Greenspan | |
| 8,407,136 B2 | 3/2013 | Bard et al. | |
| 8,407,142 B1 | 3/2013 | Griggs | |
| 8,423,349 B1 | 4/2013 | Huynh et al. | |
| 8,473,394 B2 | 6/2013 | Marshall | |
| 8,489,894 B2 | 7/2013 | Comrie et al. | |
| 8,543,506 B2 | 9/2013 | Grandcolas et al. | |
| 8,589,335 B2 | 11/2013 | Smith et al. | |
| 8,595,074 B2 | 11/2013 | Sharma et al. | |
| 8,595,098 B2 | 11/2013 | Starai et al. | |
| 8,625,838 B2 | 1/2014 | Song et al. | |
| 8,630,952 B2 * | 1/2014 | Menon | G06Q 20/3278 |
| | | | 705/44 |
| 8,635,687 B2 | 1/2014 | Binder | |
| 8,655,310 B1 * | 2/2014 | Katzer | H04M 1/72519 |
| | | | 455/410 |
| 8,655,719 B1 | 2/2014 | Li et al. | |
| 8,660,926 B1 | 2/2014 | Wehunt et al. | |
| 8,682,753 B2 | 3/2014 | Kulathungam | |
| 8,682,802 B1 | 3/2014 | Kannanari | |
| 8,700,729 B2 | 4/2014 | Dua | |
| 8,706,625 B2 | 4/2014 | Vicente et al. | |
| 8,712,839 B2 | 4/2014 | Steinert et al. | |
| 8,725,601 B2 | 5/2014 | Ledbetter et al. | |
| 8,762,211 B2 | 6/2014 | Killian et al. | |
| 8,762,237 B2 | 6/2014 | Monasterio et al. | |
| 8,781,957 B2 | 7/2014 | Jackson et al. | |
| 8,781,963 B1 | 7/2014 | Feng et al. | |
| 8,793,190 B2 | 7/2014 | Johns et al. | |
| 8,794,972 B2 | 8/2014 | Lopucki | |
| 8,851,369 B2 | 10/2014 | Bishop et al. | |
| 8,868,458 B1 | 10/2014 | Starbuck et al. | |
| 8,880,047 B2 | 11/2014 | Konicek et al. | |
| 8,887,997 B2 | 11/2014 | Barret et al. | |
| 8,924,288 B1 | 12/2014 | Easley et al. | |
| 8,954,839 B2 | 2/2015 | Sharma et al. | |
| 9,076,134 B2 * | 7/2015 | Grovit | G06Q 20/10 |
| 9,105,021 B2 | 8/2015 | Tobin | |
| 9,195,984 B1 | 11/2015 | Spector et al. | |
| 9,256,871 B2 | 2/2016 | Anderson et al. | |
| 9,256,904 B1 | 2/2016 | Haller et al. | |
| 9,372,849 B2 | 6/2016 | Gluck et al. | |
| 9,390,417 B2 | 7/2016 | Song et al. | |
| 9,396,491 B2 | 7/2016 | Isaacson et al. | |
| 9,489,694 B2 | 11/2016 | Haller et al. | |
| 9,514,456 B2 | 12/2016 | England et al. | |
| 9,519,934 B2 | 12/2016 | Calman et al. | |
| 9,558,478 B2 | 1/2017 | Zhao | |
| 9,569,473 B1 * | 2/2017 | Holenstein | G06F 16/215 |
| 9,576,318 B2 | 2/2017 | Caldwell | |
| 9,646,300 B1 | 5/2017 | Zhou et al. | |
| 9,647,855 B2 | 5/2017 | Deibert et al. | |
| 9,690,621 B2 | 6/2017 | Kim et al. | |
| 9,699,610 B1 | 7/2017 | Chicoine et al. | |
| 9,792,636 B2 | 10/2017 | Milne | |
| 9,792,648 B1 | 10/2017 | Haller et al. | |
| 9,849,364 B2 | 12/2017 | Tran et al. | |
| 9,853,959 B1 | 12/2017 | Kapczynski et al. | |
| 9,858,576 B2 | 1/2018 | Song et al. | |
| 9,978,046 B2 | 5/2018 | Lefebvre et al. | |
| 10,032,146 B2 | 7/2018 | Caldwell | |
| 10,044,647 B1 | 8/2018 | Karp et al. | |
| 10,050,779 B2 | 8/2018 | Alness et al. | |
| 10,115,155 B1 | 10/2018 | Haller et al. | |
| 10,157,420 B2 | 12/2018 | Narayana et al. | |
| 10,187,483 B2 | 1/2019 | Golub et al. | |
| 10,275,602 B2 | 4/2019 | Bjorn et al. | |
| 10,402,817 B1 | 9/2019 | Benkreira et al. | |
| 10,402,818 B2 | 9/2019 | Zarakas et al. | |
| 10,417,396 B2 | 9/2019 | Bawa et al. | |
| 10,423,948 B1 | 9/2019 | Wilson et al. | |
| 10,460,395 B2 | 10/2019 | Grassadonia | |
| 10,521,798 B2 | 12/2019 | Song et al. | |
| 10,650,448 B1 | 5/2020 | Haller et al. | |
| 10,963,589 B1 | 3/2021 | Fakhraie et al. | |

(56) References Cited

U.S. PATENT DOCUMENTS

| | | |
|---|---|---|
| 2001/0001856 A1 | 5/2001 | Gould et al. |
| 2001/0032183 A1 | 10/2001 | Landry |
| 2001/0051920 A1 | 12/2001 | Joao et al. |
| 2002/0016749 A1 | 2/2002 | Borecki et al. |
| 2002/0035539 A1* | 3/2002 | O'Connell ............. G06Q 20/32 705/39 |
| 2002/0038289 A1 | 3/2002 | Lawlor et al. |
| 2002/0095386 A1 | 7/2002 | Maritzen et al. |
| 2002/0143655 A1 | 10/2002 | Elston et al. |
| 2002/0169720 A1* | 11/2002 | Wilson ................. G07F 7/1008 705/44 |
| 2003/0046246 A1* | 3/2003 | Klumpp ................. G07F 7/025 705/64 |
| 2003/0061163 A1 | 3/2003 | Durfield |
| 2003/0097331 A1* | 5/2003 | Cohen ................... G06Q 20/10 705/39 |
| 2003/0172040 A1 | 9/2003 | Kemper et al. |
| 2003/0195847 A1 | 10/2003 | Felger |
| 2003/0200179 A1* | 10/2003 | Kwan ................... G06Q 20/385 705/65 |
| 2003/0216997 A1 | 11/2003 | Cohen |
| 2003/0217001 A1* | 11/2003 | McQuaide, Jr. ........ G06Q 20/10 705/41 |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0128243 A1* | 7/2004 | Kavanagh ............. G06Q 20/403 705/39 |
| 2004/0148259 A1 | 7/2004 | Reiners et al. |
| 2004/0178907 A1* | 9/2004 | Cordoba ............. G08B 13/1427 340/539.21 |
| 2004/0225606 A1 | 11/2004 | Nguyen et al. |
| 2004/0263901 A1 | 12/2004 | Critelli et al. |
| 2005/0010483 A1* | 1/2005 | Ling ..................... G06Q 20/10 705/39 |
| 2005/0039041 A1 | 2/2005 | Shaw et al. |
| 2005/0060233 A1* | 3/2005 | Bonalle ................. G07C 9/29 705/16 |
| 2005/0114705 A1 | 5/2005 | Reshef et al. |
| 2005/0131815 A1 | 6/2005 | Fung et al. |
| 2005/0199714 A1* | 9/2005 | Brandt ................... G06Q 20/40 235/382.5 |
| 2005/0224587 A1* | 10/2005 | Shin ................... G06K 19/0723 235/492 |
| 2005/0228750 A1 | 10/2005 | Olliphant et al. |
| 2005/0273431 A1 | 12/2005 | Abel et al. |
| 2006/0046745 A1* | 3/2006 | Davidson ............. H04M 1/72577 455/456.4 |
| 2006/0059110 A1* | 3/2006 | Madhok ............... G06Q 20/403 705/75 |
| 2006/0184456 A1* | 8/2006 | de Janasz ............. G06Q 20/40 705/72 |
| 2006/0202012 A1 | 9/2006 | Grano et al. |
| 2006/0235795 A1 | 10/2006 | Johnson et al. |
| 2006/0278698 A1* | 12/2006 | Lovett ................... G06Q 20/24 235/380 |
| 2007/0083463 A1 | 4/2007 | Kraft |
| 2007/0100773 A1 | 5/2007 | Wallach |
| 2007/0112673 A1* | 5/2007 | Protti ................... G06Q 20/32 705/44 |
| 2007/0123305 A1* | 5/2007 | Chen ................... H04L 63/0853 455/558 |
| 2007/0143831 A1 | 6/2007 | Pearson et al. |
| 2007/0203836 A1 | 8/2007 | Dodin |
| 2007/0226086 A1* | 9/2007 | Bauman ............... G06Q 10/087 705/28 |
| 2007/0255653 A1 | 11/2007 | Tumminaro et al. |
| 2007/0266257 A1 | 11/2007 | Camaisa et al. |
| 2008/0005037 A1 | 1/2008 | Hammad et al. |
| 2008/0017702 A1* | 1/2008 | Little ................... G06Q 20/04 235/379 |
| 2008/0021787 A1* | 1/2008 | Mackouse ............. G06Q 20/204 705/17 |
| 2008/0029608 A1 | 2/2008 | Kellum et al. |
| 2008/0052226 A1* | 2/2008 | Agarwal ............ G06Q 20/3821 705/39 |
| 2008/0086398 A1* | 4/2008 | Parlotto ............... G06Q 20/105 705/35 |
| 2008/0115104 A1 | 5/2008 | Quinn |
| 2008/0149706 A1* | 6/2008 | Brown ................... G06Q 40/12 235/379 |
| 2008/0154772 A1 | 6/2008 | Carlson |
| 2008/0191878 A1 | 8/2008 | Abraham |
| 2008/0208726 A1* | 8/2008 | Tsantes ................. G06Q 40/00 705/35 |
| 2008/0229383 A1* | 9/2008 | Buss ...................... G06Q 20/10 726/1 |
| 2008/0244724 A1 | 10/2008 | Choe et al. |
| 2008/0260119 A1* | 10/2008 | Marathe ................ H04M 7/125 379/93.01 |
| 2008/0283590 A1 | 11/2008 | Oder et al. |
| 2008/0301043 A1* | 12/2008 | Unbehagen ............ G06Q 30/06 705/39 |
| 2009/0005269 A1 | 1/2009 | Martin et al. |
| 2009/0055269 A1* | 2/2009 | Baron ................... G06Q 20/40 705/14.14 |
| 2009/0055642 A1 | 2/2009 | Myers et al. |
| 2009/0112763 A1* | 4/2009 | Scipioni ............... G06Q 20/10 705/41 |
| 2009/0132351 A1 | 5/2009 | Gibson |
| 2009/0205014 A1 | 8/2009 | Doman et al. |
| 2009/0228381 A1* | 9/2009 | Mik ...................... G06Q 20/10 705/34 |
| 2009/0287603 A1* | 11/2009 | Lamar, III ........... G06Q 20/102 705/40 |
| 2009/0319638 A1 | 12/2009 | Faith et al. |
| 2010/0036769 A1* | 2/2010 | Winters ............... G06Q 20/102 705/40 |
| 2010/0063906 A1* | 3/2010 | Nelsen ................... G06Q 40/12 705/30 |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1* | 5/2010 | Duke ................... G06Q 20/105 705/41 |
| 2010/0132049 A1 | 5/2010 | Vernal et al. |
| 2010/0228671 A1 | 9/2010 | Patterson |
| 2010/0274691 A1* | 10/2010 | Hammad ........... G06Q 20/3224 705/30 |
| 2010/0312700 A1 | 12/2010 | Coulter et al. |
| 2011/0023129 A1 | 1/2011 | Vernal et al. |
| 2011/0035596 A1 | 2/2011 | Attia et al. |
| 2011/0106698 A1* | 5/2011 | Isaacson ............... G06Q 30/06 705/41 |
| 2011/0176010 A1* | 7/2011 | Houjou ................. G06T 13/80 348/207.1 |
| 2011/0178929 A1 | 7/2011 | Durkin et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0276479 A1 | 11/2011 | Thomas |
| 2011/0307826 A1 | 12/2011 | Rivera et al. |
| 2012/0030109 A1* | 2/2012 | Dooley Maley ... G06Q 20/2295 705/44 |
| 2012/0041881 A1 | 2/2012 | Basu et al. |
| 2012/0046994 A1 | 2/2012 | Reisman |
| 2012/0047072 A1 | 2/2012 | Larkin |
| 2012/0096534 A1 | 4/2012 | Boulos et al. |
| 2012/0101938 A1 | 4/2012 | Kasower |
| 2012/0124658 A1 | 5/2012 | Brudnicki et al. |
| 2012/0158590 A1* | 6/2012 | Salonen ............ G06Q 20/4016 705/44 |
| 2012/0214577 A1* | 8/2012 | Petersen ................ H04L 9/00 463/25 |
| 2012/0227094 A1 | 9/2012 | Begen et al. |
| 2012/0239417 A1 | 9/2012 | Pourfallah et al. |
| 2012/0240235 A1 | 9/2012 | Moore |
| 2012/0254038 A1 | 10/2012 | Mullen |
| 2012/0259782 A1 | 10/2012 | Hammad |

(56) References Cited

U.S. PATENT DOCUMENTS

| | | | |
|---|---|---|---|
| 2012/0265682 A1* | 10/2012 | Menon | G06Q 20/354 705/44 |
| 2012/0296725 A1 | 11/2012 | Dessert et al. | |
| 2013/0031006 A1 | 1/2013 | McCullagh et al. | |
| 2013/0055378 A1 | 2/2013 | Chang et al. | |
| 2013/0080219 A1 | 3/2013 | Royyuru et al. | |
| 2013/0091452 A1 | 4/2013 | Sorden et al. | |
| 2013/0103391 A1 | 4/2013 | Millmore et al. | |
| 2013/0117696 A1 | 5/2013 | Robertson et al. | |
| 2013/0132854 A1 | 5/2013 | Raleigh et al. | |
| 2013/0151405 A1 | 6/2013 | Head et al. | |
| 2013/0173402 A1 | 7/2013 | Young et al. | |
| 2013/0174244 A1 | 7/2013 | Taveau et al. | |
| 2013/0218758 A1 | 8/2013 | Koenigsbrueck et al. | |
| 2013/0226813 A1 | 8/2013 | Voltz | |
| 2013/0254115 A1 | 9/2013 | Pasa et al. | |
| 2013/0346302 A1 | 12/2013 | Purves et al. | |
| 2013/0346306 A1 | 12/2013 | Kopp | |
| 2013/0346310 A1 | 12/2013 | Burger et al. | |
| 2014/0006209 A1* | 1/2014 | Groarke | G06Q 30/0201 705/26.61 |
| 2014/0019352 A1 | 1/2014 | Shrivastava | |
| 2014/0040144 A1 | 2/2014 | Plomske et al. | |
| 2014/0053069 A1 | 2/2014 | Yan | |
| 2014/0067683 A1 | 3/2014 | Varadarajan | |
| 2014/0076967 A1 | 3/2014 | Pushkin et al. | |
| 2014/0108263 A1 | 4/2014 | Ortiz et al. | |
| 2014/0114855 A1 | 4/2014 | Bajaj et al. | |
| 2014/0123312 A1 | 5/2014 | Marcotte | |
| 2014/0129357 A1 | 5/2014 | Goodwin | |
| 2014/0129448 A1 | 5/2014 | Aiglstorfer | |
| 2014/0143886 A1 | 5/2014 | Eversoll et al. | |
| 2014/0149368 A1 | 5/2014 | Lee et al. | |
| 2014/0172707 A1 | 6/2014 | Kuntagod et al. | |
| 2014/0198054 A1 | 7/2014 | Sharma et al. | |
| 2014/0200957 A1 | 7/2014 | Biggs | |
| 2014/0237236 A1 | 8/2014 | Kalinichenko et al. | |
| 2014/0248852 A1 | 9/2014 | Raleigh et al. | |
| 2014/0258104 A1 | 9/2014 | Harnisch | |
| 2014/0258110 A1 | 9/2014 | Davis et al. | |
| 2014/0279309 A1 | 9/2014 | Cowen et al. | |
| 2014/0279474 A1 | 9/2014 | Evans et al. | |
| 2014/0306833 A1 | 10/2014 | Ricci | |
| 2014/0337188 A1 | 11/2014 | Bennett et al. | |
| 2014/0344153 A1 | 11/2014 | Raj et al. | |
| 2014/0344877 A1 | 11/2014 | Ohmata et al. | |
| 2014/0357233 A1 | 12/2014 | Maximo et al. | |
| 2014/0372308 A1 | 12/2014 | Sheets | |
| 2014/0379575 A1* | 12/2014 | Rogan | G06Q 20/3278 705/44 |
| 2015/0019944 A1 | 1/2015 | Kalgi | |
| 2015/0026026 A1 | 1/2015 | Calman et al. | |
| 2015/0026049 A1 | 1/2015 | Theurer et al. | |
| 2015/0032625 A1 | 1/2015 | Dill et al. | |
| 2015/0032626 A1 | 1/2015 | Dill et al. | |
| 2015/0032627 A1 | 1/2015 | Dill et al. | |
| 2015/0039457 A1 | 2/2015 | Jacobs et al. | |
| 2015/0046338 A1 | 2/2015 | Laxminarayanan et al. | |
| 2015/0046339 A1 | 2/2015 | Wong et al. | |
| 2015/0082042 A1 | 3/2015 | Hoornaert et al. | |
| 2015/0100477 A1 | 4/2015 | Salama et al. | |
| 2015/0106239 A1 | 4/2015 | Gaddam et al. | |
| 2015/0112870 A1 | 4/2015 | Nagasundaram et al. | |
| 2015/0121500 A1 | 4/2015 | Venkatanaranappa et al. | |
| 2015/0134700 A1 | 5/2015 | MacKlem et al. | |
| 2015/0149357 A1 | 5/2015 | Ioannidis et al. | |
| 2015/0178724 A1 | 6/2015 | Ngo et al. | |
| 2015/0180836 A1 | 6/2015 | Wong et al. | |
| 2015/0186856 A1 | 7/2015 | Weiss et al. | |
| 2015/0193866 A1 | 7/2015 | Van Heerden et al. | |
| 2015/0199679 A1 | 7/2015 | Palanisamy et al. | |
| 2015/0199689 A1 | 7/2015 | Kumnick et al. | |
| 2015/0213435 A1 | 7/2015 | Douglas et al. | |
| 2015/0220999 A1 | 8/2015 | Thornton et al. | |
| 2015/0221149 A1 | 8/2015 | Main et al. | |
| 2015/0248405 A1 | 9/2015 | Rudich et al. | |
| 2015/0254647 A1 | 9/2015 | Bondesen et al. | |
| 2015/0254655 A1 | 9/2015 | Bondesen et al. | |
| 2015/0286834 A1 | 10/2015 | Ohtani et al. | |
| 2015/0312038 A1 | 10/2015 | Palanisamy | |
| 2015/0319158 A1 | 11/2015 | Kumnick | |
| 2015/0319198 A1 | 11/2015 | Gupta et al. | |
| 2015/0339663 A1 | 11/2015 | Lopreiato et al. | |
| 2015/0339664 A1 | 11/2015 | Wong et al. | |
| 2015/0379508 A1 | 12/2015 | Van | |
| 2016/0026997 A1 | 1/2016 | Tsui et al. | |
| 2016/0028550 A1 | 1/2016 | Gaddam et al. | |
| 2016/0028735 A1 | 1/2016 | Francis et al. | |
| 2016/0036790 A1 | 2/2016 | Shastry et al. | |
| 2016/0042381 A1 | 2/2016 | Braine et al. | |
| 2016/0063497 A1 | 3/2016 | Grant, IV | |
| 2016/0078428 A1 | 3/2016 | Moser et al. | |
| 2016/0092696 A1 | 3/2016 | Guglani et al. | |
| 2016/0092870 A1 | 3/2016 | Salama et al. | |
| 2016/0092874 A1 | 3/2016 | O'Regan et al. | |
| 2016/0098692 A1 | 4/2016 | Johnson et al. | |
| 2016/0109954 A1 | 4/2016 | Harris et al. | |
| 2016/0119296 A1 | 4/2016 | Laxminarayanan et al. | |
| 2016/0125409 A1 | 5/2016 | Meredith et al. | |
| 2016/0140221 A1 | 5/2016 | Park et al. | |
| 2016/0155156 A1 | 6/2016 | Gopal et al. | |
| 2016/0171483 A1 | 6/2016 | Luoma et al. | |
| 2016/0189121 A1 | 6/2016 | Best et al. | |
| 2016/0239437 A1 | 8/2016 | Le et al. | |
| 2016/0260176 A1 | 9/2016 | Bernard et al. | |
| 2016/0294879 A1 | 10/2016 | Kirsch | |
| 2016/0314458 A1 | 10/2016 | Douglas et al. | |
| 2016/0321669 A1 | 11/2016 | Beck et al. | |
| 2016/0328522 A1 | 11/2016 | Howley | |
| 2016/0358163 A1 | 12/2016 | Kumar et al. | |
| 2016/0379211 A1 | 12/2016 | Hoyos et al. | |
| 2017/0004506 A1 | 1/2017 | Steinman et al. | |
| 2017/0011389 A1 | 1/2017 | McCandless et al. | |
| 2017/0024393 A1 | 1/2017 | Choksi et al. | |
| 2017/0068954 A1 | 3/2017 | Hockey et al. | |
| 2017/0078299 A1 | 3/2017 | Castinado et al. | |
| 2017/0078303 A1 | 3/2017 | Wu | |
| 2017/0091759 A1 | 3/2017 | Selfridge et al. | |
| 2017/0132633 A1 | 5/2017 | Whitehouse | |
| 2017/0147631 A1 | 5/2017 | Nair et al. | |
| 2017/0161724 A1 | 6/2017 | Lau | |
| 2017/0249478 A1 | 8/2017 | Lovin | |
| 2017/0344991 A1 | 11/2017 | Mark et al. | |
| 2017/0352028 A1 | 12/2017 | Vridhachalam et al. | |
| 2017/0364898 A1 | 12/2017 | Ach et al. | |
| 2018/0005323 A1 | 1/2018 | Grassadonia | |
| 2018/0006821 A1 | 1/2018 | Kinagi | |
| 2018/0025145 A1 | 1/2018 | Morgner et al. | |
| 2018/0053200 A1 | 2/2018 | Cronin et al. | |
| 2018/0088909 A1 | 3/2018 | Baratta et al. | |
| 2018/0158137 A1 | 6/2018 | Tsantes et al. | |
| 2018/0270363 A1 | 9/2018 | Guday et al. | |
| 2019/0007381 A1 | 1/2019 | Isaacson et al. | |
| 2019/0171831 A1 | 6/2019 | Xin | |
| 2019/0197501 A1 | 6/2019 | Senci et al. | |
| 2019/0228173 A1 | 7/2019 | Gupta et al. | |
| 2019/0318122 A1 | 10/2019 | Hockey et al. | |
| 2019/0333061 A1* | 10/2019 | Jackson | G06Q 20/1085 |
| 2019/0347442 A1 | 11/2019 | Marlin et al. | |
| 2019/0356641 A1 | 11/2019 | Isaacson et al. | |
| 2019/0362069 A1 | 11/2019 | Park et al. | |
| 2019/0370798 A1 | 12/2019 | Hu et al. | |
| 2019/0392443 A1 | 12/2019 | Piparsaniya et al. | |
| 2020/0005347 A1 | 1/2020 | Boal | |
| 2020/0074552 A1 | 3/2020 | Shier et al. | |
| 2020/0090179 A1 | 3/2020 | Song et al. | |
| 2020/0118114 A1 | 4/2020 | Benkreira et al. | |
| 2020/0118133 A1 | 4/2020 | Schmidt et al. | |
| 2020/0286057 A1 | 9/2020 | Desai | |

FOREIGN PATENT DOCUMENTS

| | | |
|---|---|---|
| WO | WO-90/13096 A1 | 11/1990 |
| WO | WO-00/72245 | 11/2000 |

(56) References Cited

FOREIGN PATENT DOCUMENTS

| WO | WO-03/038551 | 5/2003 |
|----|----|----|
| WO | WO-2004/081893 | 9/2004 |
| WO | 2004/090825 A1 | 10/2004 |
| WO | WO-2009/151839 A1 | 12/2009 |
| WO | WO-2012/054148 | 4/2012 |
| WO | WO-2015/103443 | 7/2015 |
| WO | WO-2015/135131 | 9/2015 |
| WO | WO-2018/005635 | 1/2018 |

OTHER PUBLICATIONS

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Austin Telco Federal Credit Union, "Lost or Stolen Cards", www.atfcu.org/lost-stolen-cards.htm; Apr. 9, 2004. 6 pages.

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Fort Knox Federal Credit Union, "Lost or Stolen Visa Card", http://www.fortknoxfcu.org/loststolen.html, Feb. 1, 2001. 2 pages.

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

RBC Royal Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Union Bank & Trust, "Report Lost or Stolen Card", http://www.fortknoxfcu.org/loststolen.html, Jul. 10, 2005. 13 pages.

Microsoft, "Automatically summarize a document", 2016. 3 pages.

Konsko, L., "Credit Card Tokenization: Here's What You Need to Know", Nerdwallet Advertisement, Oct. 13, 2014, 4 pages.

Authorize.Net, "Authorize.Net Mobile Application: iOS User Guide", < https:// www.authorize.net/content/dam/anet-redesign/documents/iosuserguide.pdf>, Sep. 2015, 26 pages, Authorize.Net LLC. Ver. 2.0.

Fiserv, "CardValet: Mobile Application Training", <https://www.westernbanks.com/media/1664/cardvalet-application.pdf>, c. 2015, pp. 1-93, Fiserv, Inc.

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

\* cited by examiner

PAYMENT VEHICLE WITH ON AND OFF FUNCTION

CROSS-REFERENCE TO RELATED APPLICATIONS

This application is a divisional of and claims priority from U.S. patent application Ser. No. 12/316,996, filed on Dec. 18, 2008, which claims priority from U.S. Provisional Application Ser. No. 61/197,872 filed on Oct. 31, 2008. The disclosures of which are incorporated herein by reference in their entireties.

FIELD OF THE INVENTION

The present invention relates to a payment vehicle having an on and off function for use in a computer-based network for processing electronic payment transactions.

BACKGROUND OF THE INVENTION

In today's payment environment, there are a very few number of payment transactions or other financial transactions that occur with cash. Most purchases occur with forms of payment other than cash using various payment instruments such as credit cards, debit cards, among others. Furthermore, there are an increasing number of payment transactions that occur electronically or via a web interface such as over the internet or worldwide web. With an increasing volume of transactions conducted with payment instruments other than cash and often not by the purchaser in person at point of sale, there is an increased likelihood of fraudulent transactions and lack of personal control over the payment transaction.

Additionally, in today's payment environment, a payment instrument is always turned "on" leading to abuse and fraud. Currently, a payment vehicle can be blocked if a credit or debit card, for example, is lost or stolen by calling a customer service representative of the card issuer after occurrence of the fraudulent event and requesting that the card be canceled or blocked after the occurrence. There are numerous disadvantages associated with such a process. For example, there may be a delay before a payment instrument holder even recognizes that a fraudulent event occurred or is occurring using the payment holder's payment instrument. There is also a real-time delay between when a payment instrument holder recognizes that there has been fraud or abuse associated with its payment instrument and when the customer service representative is able to cancel or block the account. Fraudulent use of a card can even occur while the customer service representative is canceling or blocking the account associated with the payment vehicle. Thus, a payment holder does not have direct control and is limited by currently existing processes. Likewise, a payment instrument holder who desires to make changes to its account does not have direct control to do so and also customarily relies upon a customer service representative.

With respect to misuse or fraudulent use of a payment instrument, there are ways in today's existing payment systems to minimize fraud and abuse of the payment vehicle; however, they require assistance outside of the control of the payment vehicle holder. For example, a credit or debit card account can be closed, a temporary block can be placed on the card, or a country level block can be placed (for example, do not accept any charges being made in a specified country). Unfortunately, such controls are implemented after occurrence of the event.

Thus, there is a need to minimize the current risk to a holder of a payment instrument. There is also a need to find a way to shift control of the payment instrument to the payment instrument holder as well as to mitigate abuse and fraud associated with unauthorized use of a payment vehicle and the delays associated with mitigating such loss. There is also a need to have greater control in the payment process.

As indicated above, most payment transactions today involve the transfer of electronic funds. For purposes of background, the current industry practice with respect to electronic funds payment using a payment instrument is best shown by referring now to FIG. 1 which is a flow diagram illustrating a known process for purchaser payment. According to FIG. 1, a purchaser typically carries multiple forms of payment to allow the purchaser to choose which source of funding to use to pay for a given purchase. As is the current practice in the industry, a line of communication must be made between each form of payment used by a purchaser and each source of funds via an existing computer payment network or system. This occurs for each transaction. Thus, each transaction may require a different form of payment, a different point of sale (POS) terminal, a different computer payment system, a different source of funds, or a combination thereof. Thus, for multiple transactions, there are numerous communications and many transaction processing steps that must occur.

FIG. 2A is a flow diagram which expands upon the existing computer payment system infrastructure of FIG. 1 and is an example of a credit or debit route for a VISA or MasterCard transaction. The parties to an authorization and a settlement VISA or MasterCard transaction typically comprise a purchaser, a merchant, an optional International Sales Organization (ISO), a merchant acquirer, VISA/MasterCard, an optional issuer processor, an issuer, and a source of funds. A series of events shown in FIG. 2A has to occur for each VISA/MasterCard transaction using a VISA/MasterCard payment card used at a merchant point of sale (POS) terminal. Among the disadvantages associated with such a system is that it requires purchasers to carry multiple payment instruments that are always "on," increases the risk that a payment instrument such as a credit card or a debit card will get lost or stolen which in turn increases the risk of fraud, and does not provide the payment instrument holder the ability to control the terms and conditions of the use of the payment instrument at point of sale.

FIG. 2B is a flow diagram illustrating the current industry process for authorization of a VISA/MasterCard transaction. FIG. 2C is a flow diagram illustrating the current industry process for settlement of a VISA/MasterCard transaction. In the authorization process, as shown in FIG. 2B, a purchaser uses a VISA/MasterCard payment card to pay for goods or services at a merchant point of sale (POS) terminal, the transaction is captured by an ISO or a merchant acquirer. An ISO is an independent sales organization that is a reseller of acquirer services. A merchant acquirer is typically a bank member of a card network that collects payments on behalf of a merchant. The transaction is then routed by the merchant acquirer to the computer payment network which, in this example, is VISA or MasterCard. The transaction is then routed to an issuer. The issuer is typically a bank member of a card network that issues network approved cards. The issuer may approve or deny a transaction based upon the presence of fraudulent activity or upon funds availability. The funds availability is communicatively connected to a source of funds as shown in FIG. 2A. The transaction is either approved or declined and returned to the merchant POS terminal.

With respect to the process for settlement shown in FIG. 2C, VISA/MasterCard facilitates settlement between the merchant acquirer and issuer. The merchant acquirer then settles with the merchant. The issuer then settles with the purchaser using the funding source that is linked to the VISA MasterCard payment card.

The above process is known and currently occurs for each such payment transaction. As indicated above, there is no means for a payment holder to have direct control over the payment instrument's availability for use because it is always "on." There is no means to address fraudulent use until after the occurrence of the fraud or misuse. Thus, there remains a need for an alternative payment instrument that addresses these enumerated concerns as well as others of the payment instrument holder.

SUMMARY OF THE INVENTION

The present invention is directed to a computer-based network system and method for using a payment vehicle having an on and off function. The system comprises a payment vehicle comprising an on and off function to enable or to disable the payment vehicle in the computer-based network for processing an electronic payment transaction. The system also comprises a holder of the payment vehicle and a computer payment network. The computer payment network preferably comprises a transaction engine for enabling or for disabling the payment vehicle at a request of the holder of the payment vehicle.

The present invention also provides for a method of using the payment vehicle having an on and off function. The method generally comprises receiving a message from a payment vehicle holder to enable a payment vehicle of the payment vehicle holder prior to a payment transaction and enabling the payment vehicle by removing a block placed on the payment vehicle. Alternatively, the method generally comprises receiving a message from a payment vehicle holder to disable a payment vehicle of the payment vehicle holder and disabling the payment vehicle by placing a block on the payment vehicle.

The method of using a payment vehicle having an on and off function also generally comprises receiving a request from a user to use a payment vehicle of a payment vehicle holder for an electronic payment transaction in a computer-based payment network prior to a payment transaction, checking to see if a block has been placed or removed by the payment vehicle holder on the payment vehicle, and terminating the electronic payment transaction if the block has been placed on the payment vehicle.

There are also numerous features and functions associated with the payment vehicle having an on and off function in accordance with the present invention. Many of which are described in detail herein. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION OF THE INVENTION

Figure 1:
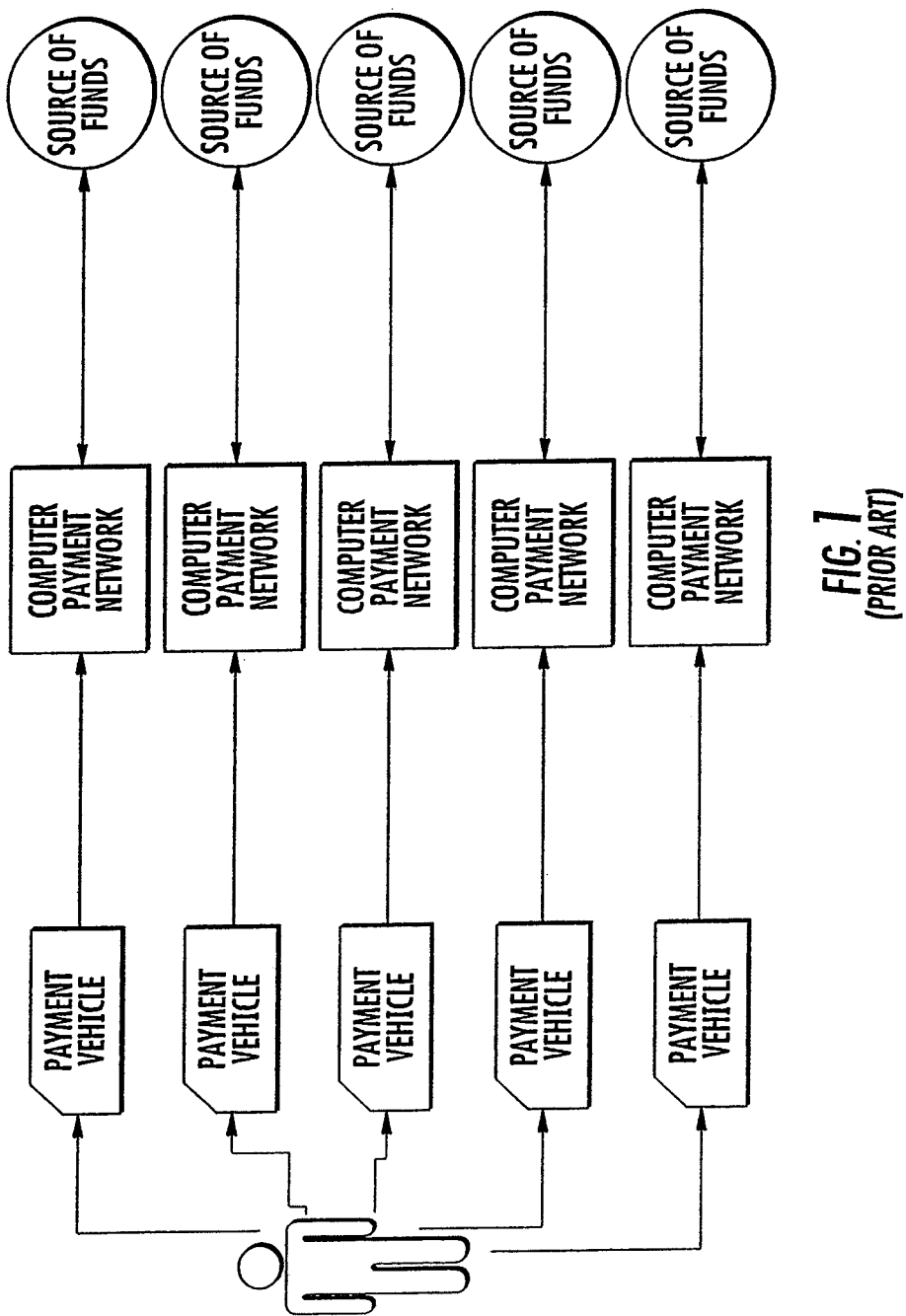
FIG. 1 is a flow diagram illustrating a known process for making purchaser payments with a traditional payment instrument and computer network payment system.
Figure 2A:
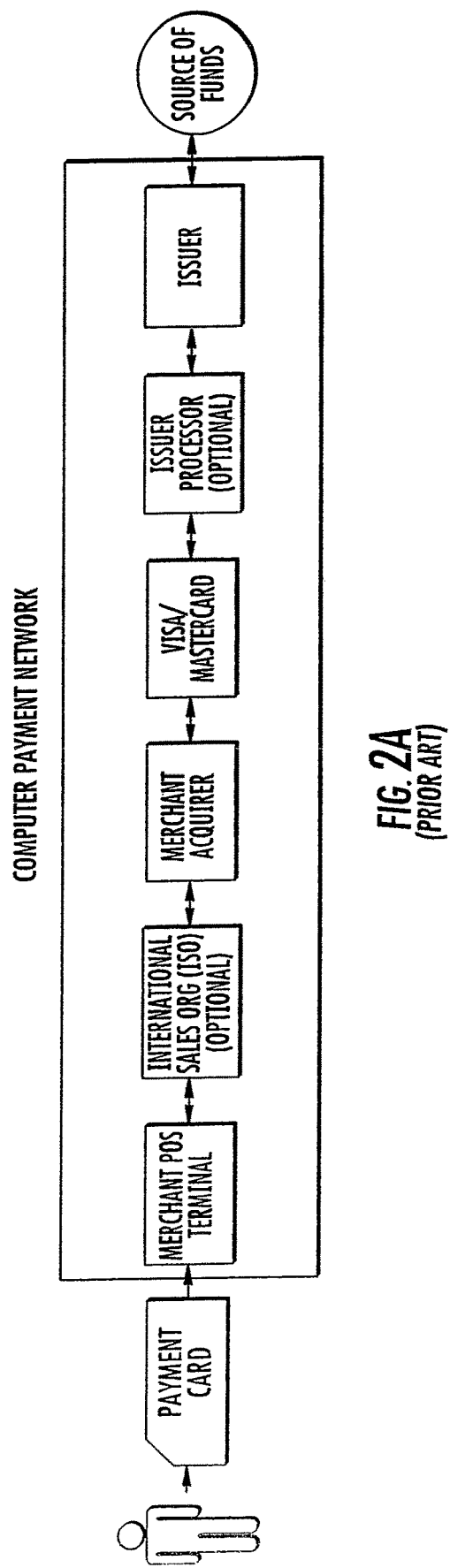
FIG. 2A is a flow diagram which expands upon the existing computer payment system infrastructure of FIG. 1 and is an example of a credit or debit route for a typical VISA or MasterCard transaction.
Figure 2B:
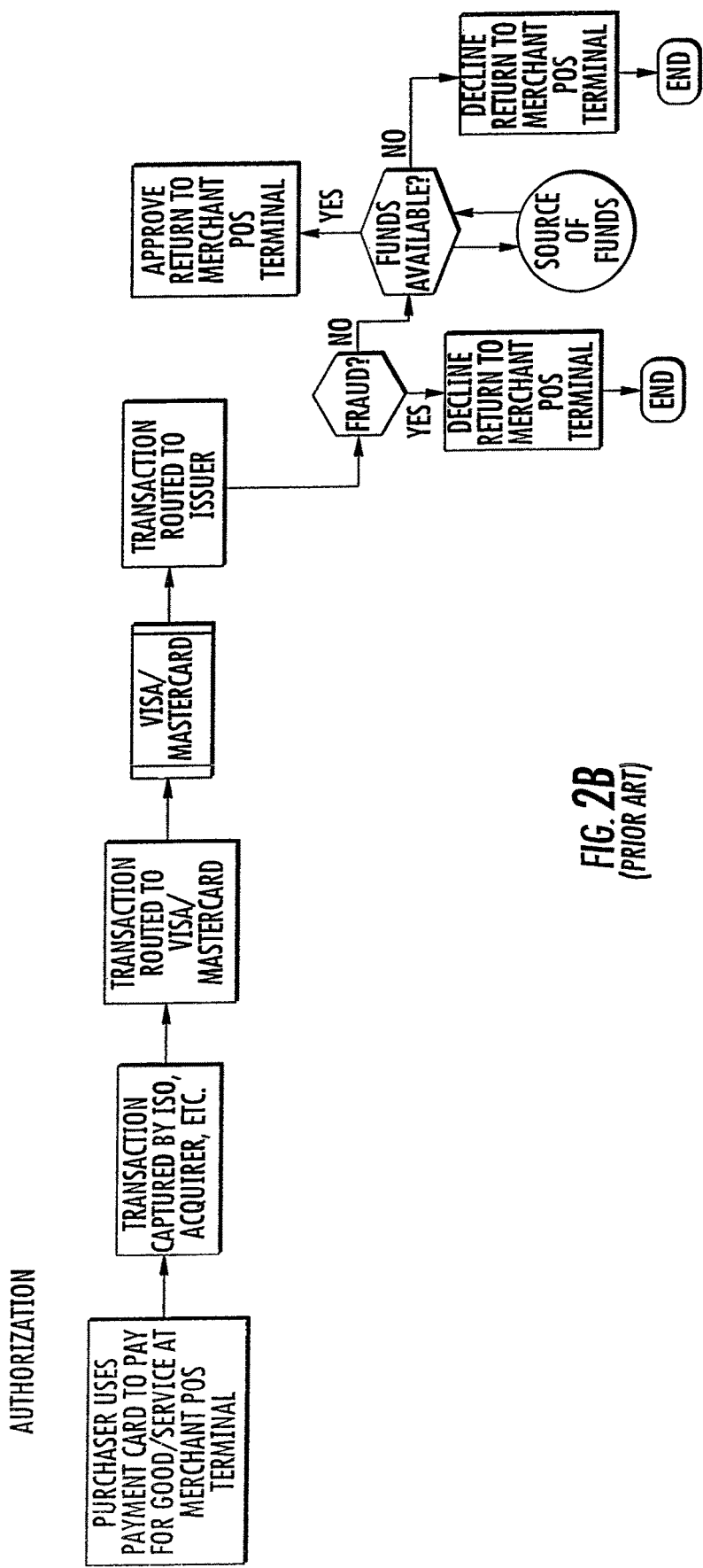
FIG. 2B is a flow diagram of the current industry process for authorization of a VISA/MasterCard transaction using a traditional payment card and computer network payment system.
Figure 2C:
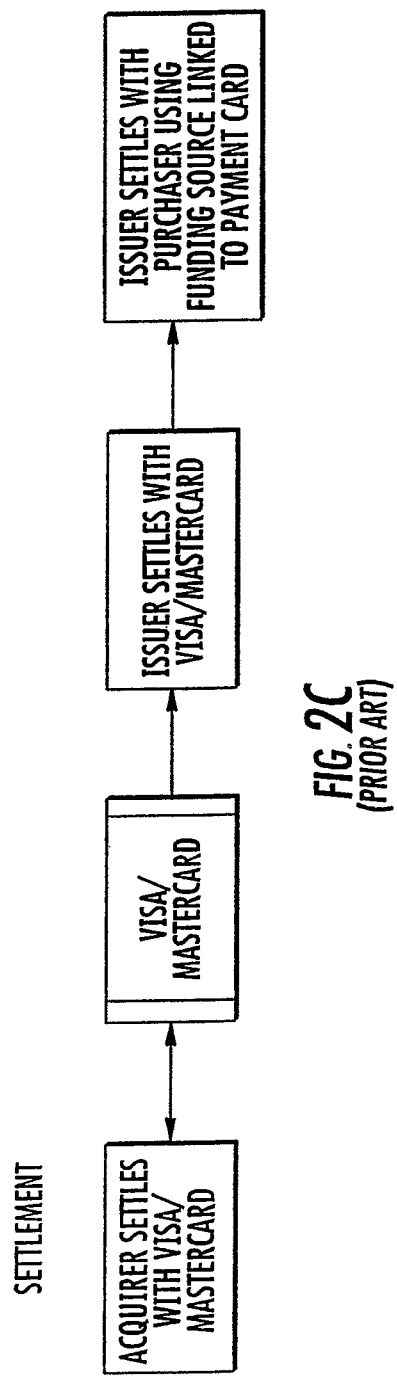
FIG. 2C is a flow diagram of the current industry process for settlement of a VISA/MasterCard transaction.

The following detailed description of the embodiment(s) is merely exemplary in nature and is in no way intended to limit the invention, its application, or uses.

The present invention relates to a payment vehicle having an "on" and "off" function. The "on" and "off" feature of the payment vehicle of the present invention permits the holder of a payment vehicle to provide instructions as to whether to turn its payment vehicle "on" when it is ready to be used and to be turned "off" to prevent use when the holder of the payment vehicle so chooses. The use to be prevented may either be of the payment vehicle holder itself or to prevent unauthorized use by another.

The present invention provides a way in which a holder of a payment vehicle, preferably a customer of the card issuer, can exert leverage or control over its payment vehicle.

A payment vehicle, as referred to herein, refers to an instrument used to conduct a payment transaction excluding cash. Examples of payment vehicles suitable for use in the present invention include, but are not limited to, a debit card, credit card, pre-paid card, stored value card, automated teller machine (ATM), wire, automated clearinghouse (ACH), online banking, online bill pay, and internet payment account. The payment vehicle of the present invention may be extended to other online payment services or instruments.

For example, a payment vehicle holder can use a device such as a personal data assistant (PDA) or a cell phone to send a text message that reads "card on" or to send a text message that reads "card off" to the bank or other institution that issued the payment vehicle to the cardholder.

The payment vehicle holder can keep the payment vehicle "off" and then send a text message to the payment vehicle issuer to turn it "on" for any number of reasons or at any time the holder of the payment vehicle so chooses. Likewise, a text message can be sent to turn it back "off" when done. There are any number of methods that are able to be used to notify to turn the payment vehicle "on" and "off" within the scope of the present invention. A text message is just one non-limiting example. The payment vehicle holder can establish or set rules with the card issuer as to when the card is to be turned "on" or "off." The holder of the payment vehicle can check card status at any time. The payment vehicle can be set to have time-based access. For example, rules may be set by time period such as the payment vehicle holder instructs to turn the payment vehicle off from 11 pm to 8 am daily. Another example is that the payment vehicle can be turned on or off based upon a specified transaction type such as by a merchant category code. Still yet another example is that the payment vehicle holder could determine that the payment vehicle only is "on" for gas and grocery purchases but "off" for internet purchases, international purchases, among others. Any number of rules could be set alone or in combination. Another example is that the payment vehicle can be turned on or off based upon country code.

In addition, the present invention relates to a payment vehicle having the "on" and "off" feature such as where the payment vehicle is an online banking account having established rules for when access is turned on and off For example, the holder of the online banking account could set a rule that there can be no payments made using the online banking account, for example, between 11 pm and 8 am daily. Alternatively, the online banking account can be set such that fund status can be viewed but funds cannot be moved or transferred.

The "on" and "off" feature could be utilized in an authorization environment or in an environment where authorizations are not utilized. An important aspect to the present invention is the "on" and "off" functionality and the ability to give a payment vehicle holder who is typically a customer of a financial institution control of the payment vehicle in a computer-based network system leveraging that functionality.

The logic which is the basis for the "on" and "off" functionality in the computer-based network system is comprised within the payment vehicle's processing environment. The following non-limiting example relates to the processing of credit cards and debit cards although the logic is readily applied to other types of payment vehicles.

As mentioned previously, a typical credit card transaction involves a two-part transaction, namely authorization and settlement. During authorization, the question is asked if the money or funds are there and the question is asked if the card is valid. It can be a signature-based transaction or a PIN-based transaction. A pin-based transaction is a transaction in which authorization and settlement occur at same time. The method of authorization is card specific and is known in the industry. For example, VISA has a different payment network than other card providers. With the payment vehicle having the "on" and "off" feature of the present invention, the merchant would know that an invalid card is turned "off" for purposes of the transaction.

Settlement processing occurs with purchases made by internet, mail order, phone order, or card on file. Some of these go through an authorization transaction coming in looking for settlement from a merchant. A payment vehicle having the "on" and "off" feature of the present invention could be used in these transactions as well as other transactions that may involve interlink, automated teller machine (ATM), ACH, wires and others.

Figure 3:
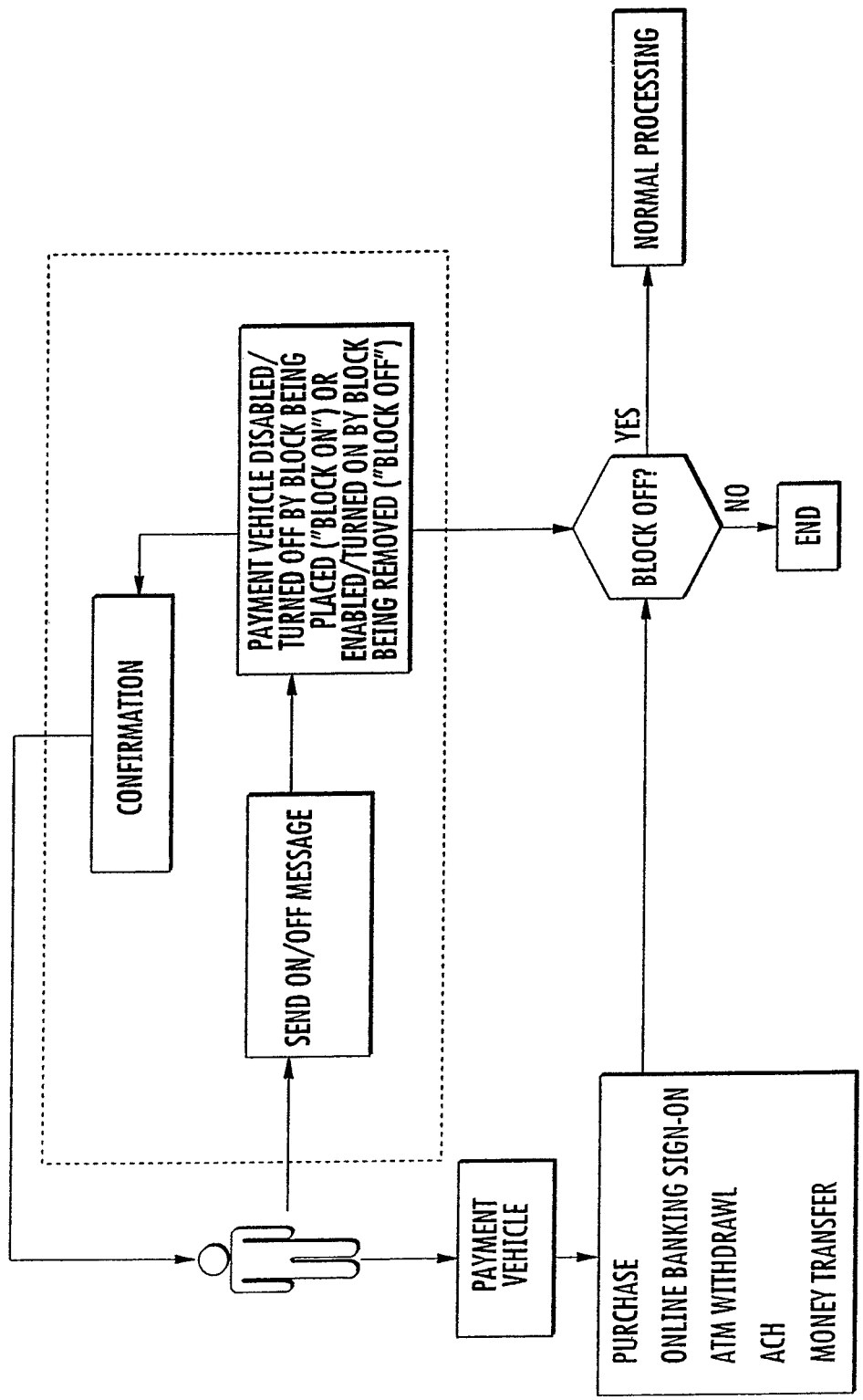
FIG. 3 is a flow diagram of the overall system and method of the present invention.

Referring now to the figures, FIG. 3 is a flow diagram illustrating the overall system and method of the present invention. As shown in FIG. 3, a payment vehicle holder sends an "on" or "off" message regarding its payment vehicle. After receipt of the message, the payment vehicle is either disabled (i.e. turned off) by a block being placed or enabled (i.e. turned on) by a block being removed. A confirmation of whether the block is on or off is electronically sent to the payment vehicle holder. The payment vehicle holder uses its payment vehicle to for example, make a purchase, sign-on to online banking, make an ATM withdrawl, make an ACH deposit, or money transfer. It is checked to see if the block is off for the payment vehicle. If the block is not off, the transaction ends. If the block is off, the transaction proceeds through normal processing for that respective payment vehicle.

Figure 4A:
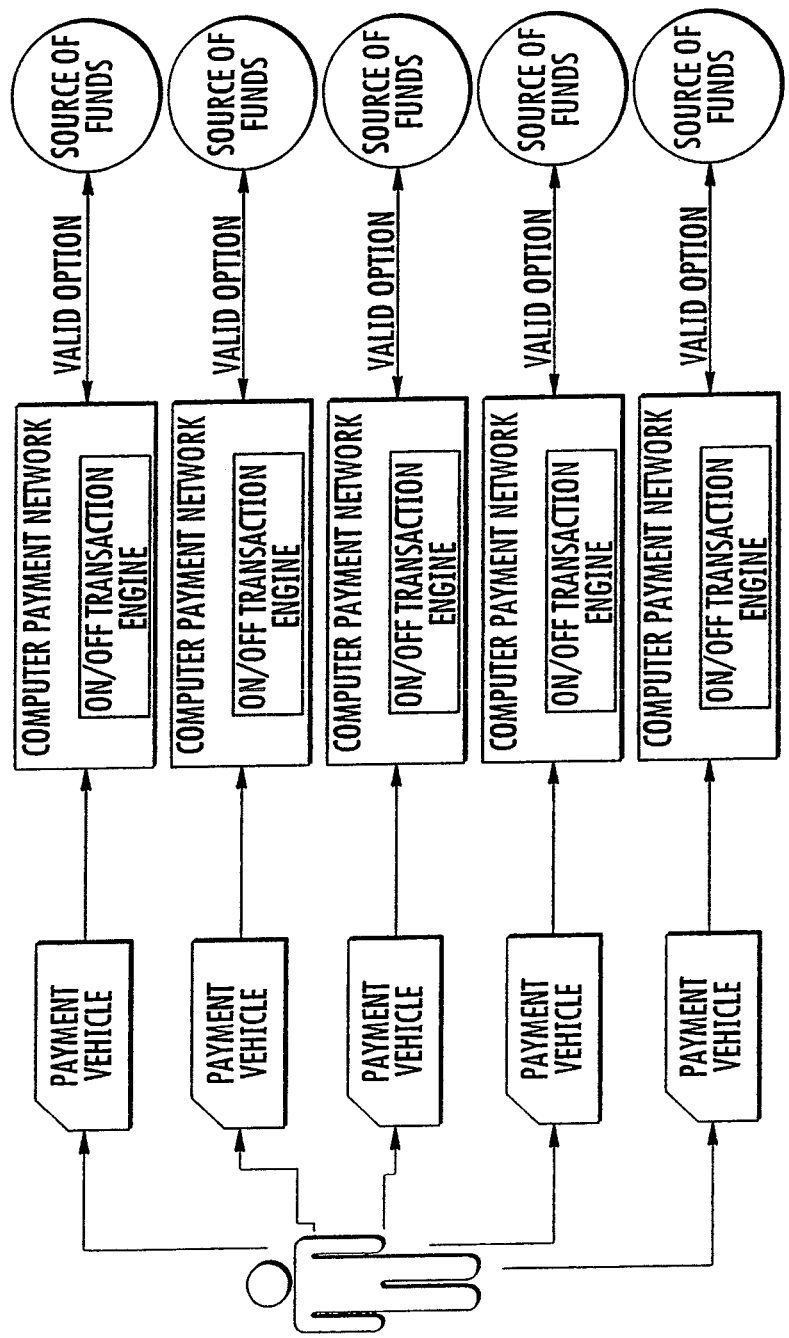
FIG. 4A is a flow diagram of the authorization process for a payment transaction using a payment vehicle having the on and off feature of the present invention.

FIG. 4A illustrates a payment vehicle having an "on" and "off" feature in accordance with the present invention for use in a computer-based environment for processing electronic payment transactions. As shown in FIG. 4A, the system comprises a user, a payment vehicle, a computer payment network comprising an "on" and "off" transaction engine, and a source of funds. Preferably, the user is the holder of the payment vehicle; however, it is within the scope of the present invention that someone other than the payment vehicle holder would use the payment vehicle to make a purchase or to access funds. The "on" and "off" transaction engine further comprises the "on" and "off" logic to determine whether or not the payment vehicle is enabled or disabled (i.e. "on" or "off") prior to a payment transaction. If the payment vehicle is "on" and a transaction is enabled (i.e. not disabled or blocked), it is a valid option and the computer payment network is connected to the source of funds. Each user potentially has access to multiple payment vehicles having this "on" and "off" functionality.

Figure 4B:
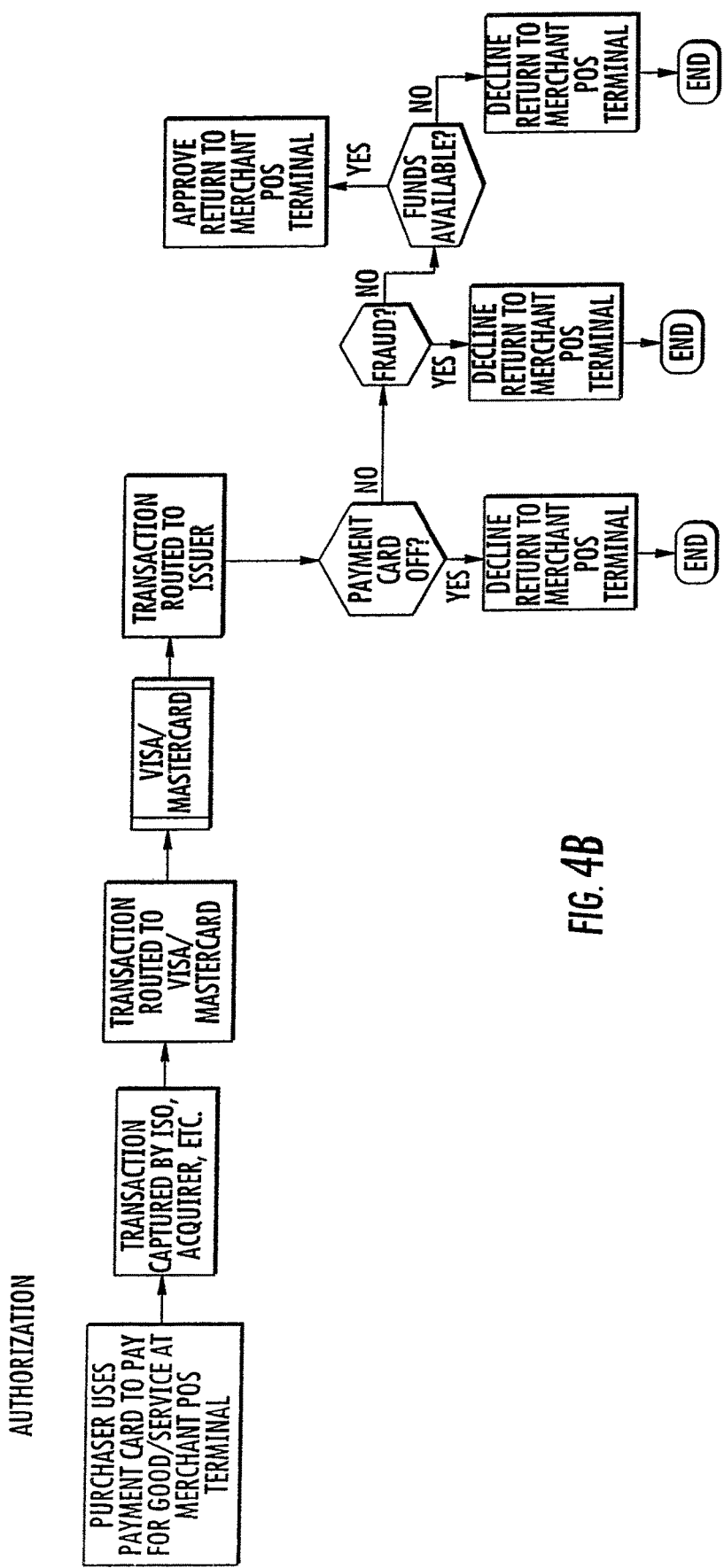
FIG. 4B is a flow diagram illustrating the overall environment in which the computer-based payment system and payment vehicle of the present invention operates.

FIG. 4B is a flow diagram of the authorization process for a payment transaction using a payment vehicle having the "on" and "off" feature of the present invention. As shown in FIG. 4B, a purchaser uses a payment card to pay for goods and services at a merchant point of sale terminal. The transaction is captured by the ISO or merchant acquirer. The transaction is routed to VISA/Mastercard. From VISA/Mastercard, the transaction is routed to the issuer. The "on" and "off" transaction engine of the computer payment network queries whether the payment card is "off." If it is "off," the transaction is declined and returned to merchant point of sale terminal. If the payment card is not "off," it is further processed to determine if there is fraud associated with the transaction. If there is fraud, the transaction is declined and returned to merchant point of sale terminal. If there is no fraud, the computer payment network checks to see if funds are available. If funds are available, the transaction is approved and returned to merchant point of sale terminal. If funds are not available, the transaction is declined and returned to merchant point of sale terminal.

Figure 4C:
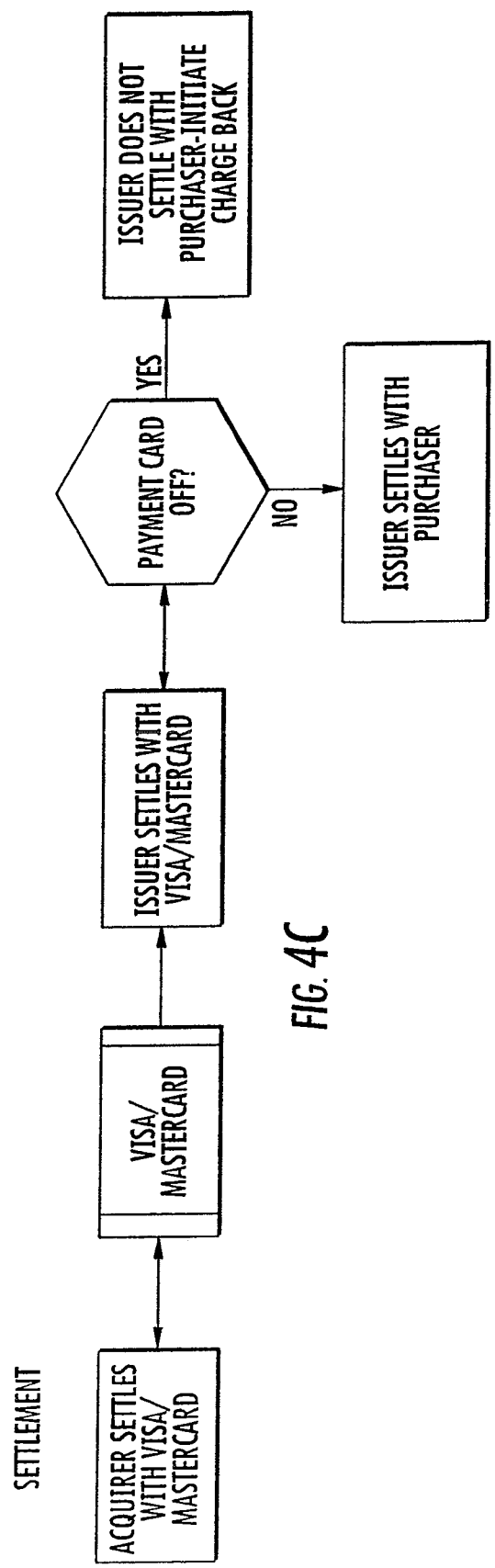
FIG. 4C is a flow diagram illustrating the settlement process for a payment transaction using a payment vehicle having the on and off feature of the present invention.

FIG. 4C is a flow diagram illustrating the settlement process for a payment transaction using a payment vehicle having the "on" and "off" feature of the present invention. As shown in FIG. 4C, the merchant acquirer settles with VISA/Mastercard. From VISA/Mastercard, the issuer settles with VISA/Mastercard. The "on"/"off" transaction engine queries whether the payment card is "off." If the payment card is not "off," the issuer settles with the purchaser. If the payment card is "off," the issuer does not settle with the purchaser and initiates charge back to the card.

As discussed herein, a payment vehicle having the "on" and "off" feature of the present invention allows the holder of the payment vehicle to remotely enable or disable its payment vehicle. The present invention provides a payment vehicle holder such as a customer of a financial institution control over its payment vehicle through leveraging of the "on" and "off" logic that may be transmitted, for example, via text message, e-mail, or other electronic means. While the present invention may be run in a variety of settings, it is advantageous for its logic to be run in a card processing environment.

There are numerous other features that are optionally associated with a payment vehicle having the "on" and "off" feature of the present invention. For example, a payment vehicle holder such as a customer of a financial institution is able to get the latest status of his or her payment vehicle. For example, the status may be enabled or disabled as well as more detailed reporting. This core functionality leads to additional features as described below.

Among the features of the present invention include time based access to the payment vehicles. For example, the payment vehicle is enabled from x time to y time. This may also be used for online banking access also.

A two credit/debit level authorization per transaction is another feature. For example, a customer will receive a communication, including but not limited to, a short message service (sms), a phone recording, or email verifying that it is permissible to allow the transaction.

Another feature of the payment vehicle of the present invention provides for the holder of the payment vehicle to refuse or stop a transaction that exceeds a predefined amount. The user may also refuse or stop a transaction of a specific type or limit the use of the payment vehicle to transactions of a certain type or merchant category code.

Yet another feature of the payment vehicle of the present invention is confirmation messaging. The payment vehicle holder receives a communication, including but not limited to, a sms, a phone recording, or email verifying that the payment vehicle holder's request to turn the payment vehicle on or off has been accomplished.

Still yet another feature of the payment vehicle of the present invention is vendor messaging. For example, when a person attempts to use a payment vehicle that has been turned off, the vendor receives a message informing him or her that the card is rejected as it is turned off.

It is within the scope of the present invention that this "on" and "off" feature associated with a payment vehicle is applicable to both existing and new customers, for example, of an institution such as a financial institution that is a card issuer. A customer enrolls for such a program and his/her account is marked accordingly. A customer selects a card account and agrees to use a card having the "on" and "off" feature. A customer then receives notification of enrollment, instructions, and initial card status. Such functionality is comprised, for example, in a card on/off transaction engine.

Thus, the payment vehicle of the present invention is advantageous for many reasons including because it provides additional security for payment vehicles. The payment vehicle of the present invention having the "on" and "off" feature permits customers to easily manage the security of their payment vehicles by switching them off when not in use. With the present invention, it is possible to disable the payment vehicle, such as a credit card, for safety or other purposes whenever the holder of a payment vehicle so chooses. For example, messaging is accomplished by sms or email.

Another advantage of the payment vehicle and method of the present invention is that it enhances loyalty through appreciation for the additional security, flexibility, and control that it provides consumers over their payment vehicles.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method comprising:
   receiving, by a computing system of an issuer of a payment vehicle, a text message from a mobile computing device of a holder of the payment vehicle, the text message including a user-input instruction of the holder of the payment vehicle, the user-input instruction including criteria defining unauthorized transactions electronically processed by a computer-based payment network for the payment vehicle, the user-input instruction providing a time range during which online banking access for the payment vehicle is to be disabled;
   updating, by a transaction engine of the computing system, logic associated with the payment vehicle such that electronic transaction requests meeting the criteria are automatically denied and electronic transaction requests not meeting the criteria are approved without requiring subsequent authorization from the holder of the payment vehicle, wherein approved transactions are settled by the issuer using a funding source linked to the payment vehicle;
   receiving, by the computing system, an electronic transaction request from a point of sale (POS) terminal of a merchant, the electronic transaction request having been generated by the POS terminal following presentation of the payment vehicle to the POS terminal;
   determining, by the logic, that the electronic transaction request meets the criteria defined by the text message;
   in response to determining that the electronic transaction request meets the criteria, (i) declining, by the computing system, the electronic transaction request such that a payment corresponding to the electronic transaction request is not settled by the issuer, (ii) transmitting, by the computing system, a first electronic message to the POS terminal indicating that the payment vehicle is rejected for meeting criteria from the holder of the payment vehicle defining unauthorized transactions, and (iii) transmitting, by the computing system, a second electronic message to the mobile computing device indicating that the transaction request was declined for meeting criteria from the holder of the payment vehicle defining unauthorized transactions;
   receiving, by the computing system, a request for online banking access to the payment vehicle;
   determining, by the computing system, that the request for online banking access is received during the time range provided in the user-input instruction; and
   in response to determining that the request for online banking access is received during the time range, denying online banking access to the payment vehicle.

2. The method according to claim 1, further comprising, transmitting, by the computing system and to the mobile computing device, a confirmation text message that the logic has been updated.

3. The method according to claim 1, further comprising:
receiving, by the computing system, an additional text message from the mobile computing device with a term "off" in the text message; and
updating, by the transaction engine of the computing system, the logic such that the payment vehicle is deactivated for all transactions in response to receiving the additional message.

4. The method according to claim 1, wherein the transaction engine resides in the computing system of the issuer of the payment vehicle, the computing system of the issuer being part of the computer-based payment network.

5. The method according to claim 1, wherein the criteria define transactions falling within a defined transaction amount range.

6. The method according to claim 1, wherein the criteria define transactions conducted at a set of merchants.

7. The method according to claim 1, wherein the criteria define unauthorized transactions based on a type of goods.

8. The method according to claim 1, wherein the criteria define unauthorized transactions based on whether the transactions are for internet purchases.

9. The method of claim 1, wherein the criteria include a merchant category code corresponding to a category of merchants at which transactions are unauthorized.

10. The method of claim 1, wherein the criteria include a country code identifying countries in which transactions are unauthorized.

11. A method comprising:
receiving, by a computing system of an issuer of a payment vehicle, a text message from a mobile computing device of a holder of the payment vehicle, the text message including a user-input instruction of the holder of the payment vehicle, the user-input instruction including criteria defining unauthorized transactions electronically processed by a computer-based payment network for the payment vehicle, the user-input instruction providing a time range during which online banking access for the payment vehicle is to be disabled;
updating, by a transaction engine of the computing system, logic associated with the payment vehicle such that electronic transaction requests meeting the criteria are automatically denied and electronic transaction requests not meeting the criteria are approved without requiring subsequent authorization from the holder of the payment vehicle, wherein approved transactions are settled by the issuer using a funding source linked to the payment vehicle;
transmitting by the computing system, a notice confirming the updating of the logic to the mobile computing device;
receiving, by the computing system, an electronic transaction request from a point of sale (POS) terminal of a merchant, the electronic transaction request having been generated by the POS terminal following presentation of the payment vehicle to the POS terminal;
determining, by the logic, that the electronic transaction request meets the criteria defined by the text message; and
in response to determining that the electronic transaction request meets the criteria, (i) declining, by the computing system, the electronic transaction request such that a payment corresponding to the electronic transaction request is not settled by the issuer, (ii) transmitting, by the computing system, a first electronic message to the POS terminal indicating that the payment vehicle is rejected for meeting criteria from the holder of the payment vehicle defining unauthorized transactions, and (iii) transmitting, by the computing system, a second electronic message to the mobile computing device indicating that the transaction request was declined for meeting criteria from the holder of the payment vehicle defining unauthorized transactions;
receiving, by the computing system, a request for online banking access to the payment vehicle;
determining, by the computing system, that the request for online banking access is received during the time range provided in the user-input instruction; and
in response to determining that the request for online banking access is received during the time range, denying online banking access to the payment vehicle.

12. The method of according to claim 11, wherein the message is in the form of a short message service (sms) text message.

13. The method according to claim 11, wherein the notice and the message are in the same form.

14. The method according to claim 11, wherein the transaction engine resides in the computing system of the issuer of the payment vehicle, the computing system of the issuer being a part of the computer-based payment network.

15. The method according to claim 11, further comprising:
receiving, by the computing system, an additional text message from the mobile computing device with a term "off" in the text message; and
updating, by the transaction engine of the computing system, the logic such that the payment vehicle is deactivated for all transactions in response to receiving the additional message.

16. The method according to claim 11, wherein the criteria define transactions falling within a defined transaction amount range.

17. The method according to claim 11, wherein the criteria define transactions conducted at a set of merchants.

* * * * *